United States Patent
Nambata et al.

(10) Patent No.: US 11,867,522 B2
(45) Date of Patent: Jan. 9, 2024

(54) MAP INFORMATION-PROVIDING SYSTEM, MAP INFORMATION-PROVIDING METHOD, AND MAP INFORMATION-PROVIDING PROGRAM

(71) Applicant: PIONEER CORPORATION, Tokyo (JP)

(72) Inventors: Ippei Nambata, Saitama (JP); Reiji Matsumoto, Saitama (JP); Tetsuya Takahashi, Saitama (JP); Katsumi Amano, Saitama (JP); Takashi Aoki, Saitama (JP); Kazuki Oyama, Saitama (JP); Yuuki Matsumoto, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 21 days.

(21) Appl. No.: 16/959,961

(22) PCT Filed: Dec. 27, 2018

(86) PCT No.: PCT/JP2018/048225
§ 371 (c)(1),
(2) Date: Jul. 2, 2020

(87) PCT Pub. No.: WO2019/135393
PCT Pub. Date: Jul. 11, 2019

(65) Prior Publication Data
US 2021/0063191 A1 Mar. 4, 2021

(30) Foreign Application Priority Data
Jan. 4, 2018 (JP) .................... 2018-000169

(51) Int. Cl.
G01C 21/36 (2006.01)
G01C 21/32 (2006.01)
G05D 1/02 (2020.01)

(52) U.S. Cl.
CPC ........ *G01C 21/3638* (2013.01); *G01C 21/32* (2013.01); *G01C 21/3694* (2013.01); *G05D 1/0274* (2013.01)

(58) Field of Classification Search
CPC .............. G01C 21/3638; G01C 21/32; G01C 21/3694; G01C 21/3667; G01C 21/387; G05D 1/0274; G09B 29/106
See application file for complete search history.

(56) References Cited

U.S. PATENT DOCUMENTS 8,855,904 B1* 10/2014 Templeton ........... G08G 1/0141
701/119
2005/0049784 A1* 3/2005 Ikeuchi ................. G01C 21/32
340/995.14

(Continued)

FOREIGN PATENT DOCUMENTS

JP 2011047662 A 3/2011
JP 2017007572 A 1/2017

(Continued)

OTHER PUBLICATIONS

Extended European Search Report dated Aug. 9, 2021 from counterpart EP Patent Application No. 18898877.8, 9 pages.

(Continued)

*Primary Examiner* — Rami Khatib
(74) *Attorney, Agent, or Firm* — Procopio, Cory, Hargreaves & Savitch LLP

(57) ABSTRACT

A map information-providing system, a map information-providing method, and a map information-providing program which can provide map information while suppressing incongruity a recipient feels are provided. A navigation system-(map information-providing system) includes a storage unit-storing map information for navigation (first map information) and map information for autonomous driving (second map information) an updating period thereof is (Continued)

different from the map information for navigation with respect to at least a portion of a period of time, and a map information-providing unit which performs driving guidance by providing at least a portion of items to be provided by the map information for navigation using the map information for autonomous driving in a case where the map information for autonomous driving bad been updated based on newer information than the map information for navigation at a time of performing driving guidance.

6 Claims, 5 Drawing Sheets

(56) References Cited

U.S. PATENT DOCUMENTS

| | | | |
|---|---|---|---|
| 2015/0074068 A1* | 3/2015 | Scharmann | G01C 21/32 |
| | | | 707/695 |
| 2016/0273925 A1 | 9/2016 | Maekawa et al. | |
| 2019/0114921 A1* | 4/2019 | Cazzoli | H04W 4/40 |
| 2020/0098135 A1* | 3/2020 | Ganjineh | G06K 9/00818 |

FOREIGN PATENT DOCUMENTS

| | | |
|---|---|---|
| JP | 2017173286 A | 9/2017 |
| JP | 2017181390 A | 10/2017 |

OTHER PUBLICATIONS

International Search Report and Written Opinion for related JP App. No. PCT/JP2018/048225 dated Apr. 2, 2019; 6 pages.

* cited by examiner

MAP INFORMATION-PROVIDING SYSTEM, MAP INFORMATION-PROVIDING METHOD, AND MAP INFORMATION-PROVIDING PROGRAM

TECHNICAL FIELD

This invention relates to a map information-providing system, a map information-providing method, and a map information-providing program which provide map information.

BACKGROUND ART

As an example of a map information-providing system, a navigation system which performs driving guidance such as route guidance to a destination or the like to a driver is conventionally known (for example, refer to Patent Document 1). Many of such navigation systems provide map information using map information for navigation stored in a storage unit inside, perform a search or the tike for the most appropriate route to a destination, and perform route guidance or the like based on a result of the search.

Here, among navigation systems, there is a system which is connected to a network environment and appropriately receives update of map information for navigation from a server on the network. Accuracy of guidance can be increased since the navigation system can recognize newly built roads or the like by this update.

CITATION LIST

Patent Document

[Patent Document]: Japanese Unexamined Patent Application Publication No. 2017-173286

SUMMARY OF THE INVENTION

Technical Problem

Here, in the navigation system as mentioned above, update of map information for navigation is often performed setting an updating period of a fixed interval since it takes time and costs for an updating process. Therefore, the update of the map information for navigation tends to be performed in a long span of time, for example, every half year or the like. As a result, a present situation is that, depending on a timing at which driving guidance is performed, there is a possibility that incongruity is given to a driver since discrepancy is generated between map information provided by the navigation system and an actual road environment.

Meanwhile, up until here, the incongruity a recipient feels regarding the map information provided by the map information-providing system has been explained with a navigation system as an example. However, not limited to a navigation system, the incongruity like this can be generated in general in any systems which provide map information.

Therefore, an example of the problem to be solved by the present invention is to provide a map information-providing system, a map information-providing method, and a map information-providing program which can provide map information while suppressing the incongruity a recipient feels.

Solution to Problem

In order to solve the problem and to achieve the object aforementioned, a map information-providing system of the present invention described in claim 1 includes: a storage unit storing tint map information, and second map information updating period thereof is different from the first map information with respect to at least a portion of a period of time; and a map information-providing unit which provides map information by providing at least a portion of items to be provided by the first map information using the second map information in a case where the second map information has been updated based on newer information than the first map information at a time of providing the map information.

BRIEF DESCRIPTION DRAWINGS

DESCRIPTION OF EMBODIMENT

Figure 1:
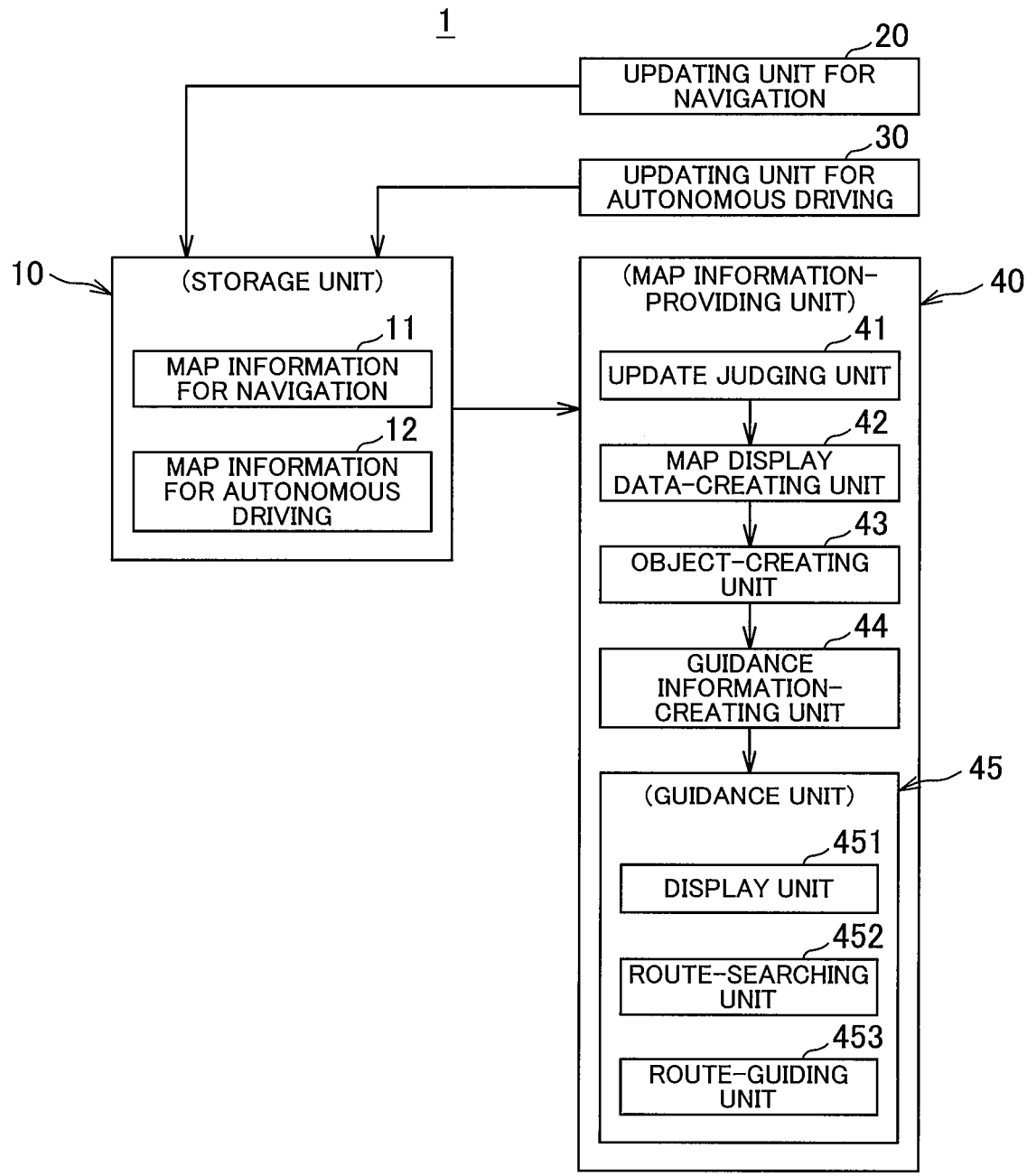
FIG. 1 is a schematic block diagram illustrating a navigation system according to an example of the present invention.

An embodiment of the present invention will be described below. A map information-providing system according to the embodiment of the present invention includes a storage unit storing first map information, and second map information updating period thereof is different from the first map information with respect to at least a portion of a period of time. In addition, this map information-providing system includes a map information-providing unit. The map information-providing unit provides map information by providing at least a portion of items to be provided by the first map information using the second map information in a case where the second map information had been updated based on newer information than the first map information at a time of providing the map information.

In the map information-providing system in the present embodiment, the first map information and the second map information updating periods thereof are different from each other for at least a portion of a period of time are stored in a storage unit. In addition, the map information-providing unit provides map information by using the second map information in a case where the second map information had been updated based on the newer information than the first map information at a time of providing the map information. That is, even when discrepancy is generated between an actual road environment and the first map information, map information based on the second map information which has higher consistency with the actual road environment is provided. In addition to that, even when there are items which are in short of information in the second map information, at least a portion of the items is complemented using the second map information which is new information and provided. Thus, according to the map information-providing system of the present embodiment, map information can be provided while suppressing incongruity a driver feels by using the second map information which has high consistency with the actual road environment and by providing missing items using the second map information.

In the map information-providing system of the present embodiment, the first map information is map information for navigation having image information for providing driving guidance to a driver of a vehicle. Further, the second map information is map information for autonomous driving having control information for autonomous driving of a vehicle.

Generally, due to the nature of being used for autonomous driving, the map information for autonomous driving is demanded to have high consistency with the actual road environment. Therefore, the map information for autonomous driving is updated in a shorter span of time compared to the map information for navigation which is updated in a long span of time as mentioned above. In the map information-providing system in the present embodiment, the map information-providing unit provides the map information by using the map information for autonomous driving in a case where the map information for autonomous driving was updated based on newer information than the map information for navigation at a time of providing the map information. That is, even when discrepancy is generated between an actual road environment and the map information for navigation, map information based on the map information for autonomous driving which has higher consistency with the actual road environment is provided. In addition to that, at least a portion of the items for a driver provided by the map information for navigation which are not originally included in the map information for autonomous driving is complemented using the map information for autonomous driving which is new information and provided. Thus, according to the map information-providing system of the present embodiment, map information can be provided while suppressing incongruity a driver feels by using of the map information for autonomous driving which has high consistency with the actual road environment and by providing items using the map information for autonomous driving.

Here, in the navigation system in the present embodiment, route guidance to a destination is included in the above-mentioned items. In addition, the map information-providing unit includes a guidance information-creating unit and a guidance unit. The guidance information-creating unit creates at least a portion of the guidance information for route guidance using the control information in the map information for autonomous driving. The guidance unit performs the route guidance based on a result of information creation in the guidance information-creating unit.

As described above, in many cases, the guidance information for a driver such as, for example, guiding which of turning right, turning left, and going straight at which point before an intersection is not included in the map information for autonomous driving which is not intended to be referred to by a driver. According to the map information-providing system in the present embodiment, such guidance information is created from the control information of the map information for autonomous driving. This enables the driving guidance based on the guidance information, and thus map information can be provided in the form of driving guidance while further suppressing the incongruity the driver feels.

Further, in the navigation system in the present embodiment, a map information-providing unit includes a map display data-creating unit and an object-creating unit. The map display data-creating unit creates display data for map for autonomous driving to visualize the control information in the map information for autonomous driving. Using the control information, the object-creating unit creates object information corresponding to at least a portion of non-included objects which are not included in the display data for map for autonomous driving out of image objects in the map information for navigation.

Meanwhile, the display data for map for autonomous driving referred here means data to visualize the control information in the map information for autonomous driving in order to be visible to a driver, and does not mean that such data is used in autonomous driving. Autonomous driving is performed using the control information in the map information for autonomous driving.

In many cases, an image object which visually presents information to a driver such as, for example, a lane image and a destination signboard, or the like, is not included in the display data for map for autonomous driving to visualize the map it for autonomous driving which is not intended to be referred to by a driver. According to the map information-providing system in the present embodiment, the object information corresponding to at least a portion of the non-included objects which are not included in the display data for map for autonomous driving as mentioned above is created from the control information of the map information for autonomous driving. This enables driving guidance based on the display data for map for autonomous driving including the image object shown by such object information, and thus driving guidance can be performed while further suppressing incongruity a driver feels.

Further, the map information-providing method according to the embodiment of the present invention includes an update judging step and a map information-providing step. The update judging step is a step of judging whether the second map information an updating period thereof is different from the first map information for at least a portion of a period of time has been updated based on newer information than the first map information at the time of providing the map information or not. The map information-providing step is a step of providing the map information by providing at least a portion of items to be provided by the first map information using the second map information, when it is judged that the second map information has been updated based on the newer information than the first map information.

In the map information-providing method in the present embodiment also, in a case where the second map information had been updated based on the newer information than the first map information at the time of providing map information, the map information is provided by providing at least a portion of the items to be provided based on the second map information. Consequently, map information can be provided while suppressing incongruity a recipient feels.

Further, a map information-providing program according to the embodiment of the present invention causes the map information-providing method in the above-mentioned embodiment to be performed by a computer. Consequently, the above-mentioned map information-providing method is performed, and thus the map information can be provided while suppressing incongruity a recipient feels.

Meanwhile, "time of providing the map information" stated in the present embodiment means a time when the map information is shown to a recipient, for example, a driver of a vehicle or the like, who is to be provided with the map information by image display or the like.

EXAMPLE

An example of the present invention will be described specifically below with reference to the drawings.

FIG. 1 is a schematic block diagram illustrating a navigation system according to an example of information-providing system of the present invention.

A navigation system 1 shown in FIG. 1 is mounted in a vehicle having an autonomous driving function and performs driving guidance to a driver, and includes a storage unit 10, an updating unit for navigation 20, an updating unit for autonomous driving 30, and a map information-providing unit 40.

The storage unit 10 stores map information for navigation 11 (first map information) and map information for autonomous driving 12 (second map information) updating periods thereof are different from each other for at least a portion of a period of time. The map information for navigation 11 includes image information for driving guidance to a driver of a vehicle. The map information for autonomous driving 12 includes control information for autonomous driving of the vehicle. Meanwhile, regarding an updating period, an updating period of the map information for navigation 11 and that of the map information for autonomous driving 12 may be different throughout the period, or, may be different for a portion of the period while corresponding to each other for other portions of the period.

Figure 2:
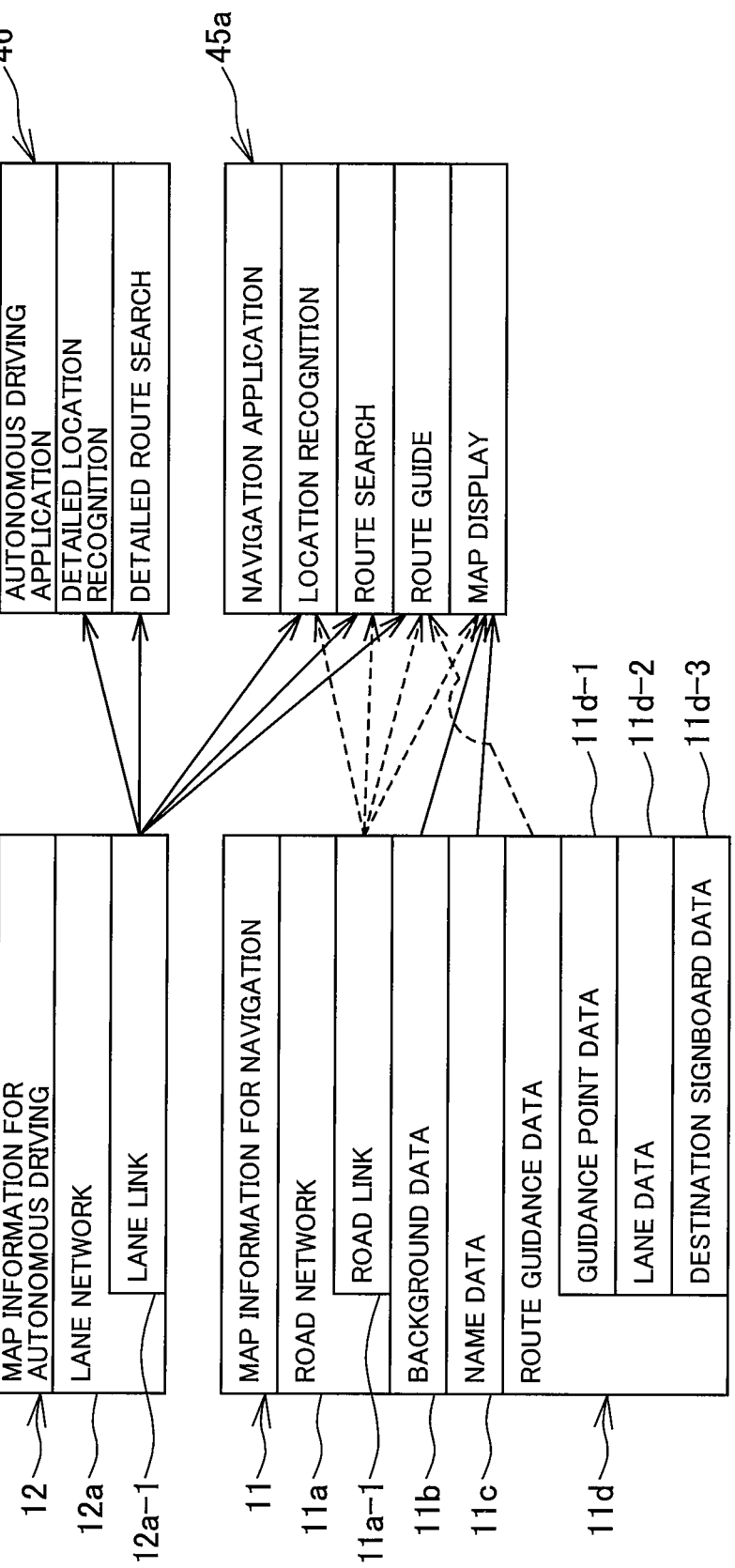
FIG. 2 is a schematic diagram illustrating map information for navigation and map information for autonomous driving shown in FIG. 1.

FIG. 2 is one example of a schematic diagram illustrating map information for navigation and map information for autonomous driving shown in FIG. 1.

The map information for navigation 11 includes a road network 11a, background data 11b, name data 11c, and route guidance data 11d, or the like. The road network 11a is information which shows a road configuration in the map information by a road link 11a-1 which is a road divided at a predetermined section. Information such as a road width, the number of lanes, or the like is given as attribute information to each road link 11a-1. The background data 11b is information which shows buildings, facilities or the like in the vicinity of the road. The name data 11c is information which shows names of the roads, buildings or facilities in the vicinity thereof, or the like. The route guidance data 11d is information which is provided at a time of driving guidance and includes guidance point data 11d-1, lane data 11d-2, and destination signboard data 11d-3. The guidance point data 11d-1 is information which shows a point on a map at which information of turning right or turning left at an intersection or the like is to be provided, and a to-be-provided content provided at that point. The lane data 11d-2 is information which shows a traveling direction of a lane or the like on a road with an arrow or the like. The destination signboard data 11d-3 is information which simulated a road signboard which shows a direction such as, for example, to Nagoya, to Tokyo, or the like with an arrow, a name of a place, or the like.

The map information for navigation 11 is referred to by an application program for navigation (hereinafter referred to as a navigation application) 45a which builds each function of a guidance unit 45 shown in FIG. 1. The navigation application 45a performs a location recognition of a vehicle on the road network 11a with reference to the road network 11a and a location of the vehicle. Further, the navigation application 45a searches for the most appropriate guidance route from the location of the vehicle and a destination using the road network 11a. Further, regarding a predetermined area around the location of the vehicle, the map information for navigation 11 is visualized und displayed, and the route guidance along the searched guidance route is performed. In this route guidance, various image information shown by the lane data 11d-2 and the destination board data 11d-3 regarding a road on which a vehicle is running is overlaid on the map information for navigation 11 and displayed. Further, when the location of the vehicle approaches to a location shown by the guidance point data 11d-1, the to-be-provided content shown by the guidance point data 11d-1 is provided to a driver by an image or voice.

The map information for autonomous driving 12 includes a lane network 12a. The lane network 12a is an example of control information used in autonomous driving which shows a road configuration in detail by a lane link 12a-1 which is a lane on a road divided at a predetermined section.

The map information for autonomous driving 12 is referred to by an application program for autonomous driving (hereinafter referred to as an autonomous driving application) 46 which performs drive control for autonomous driving of a vehicle. The autonomous driving application 46 performs a detailed location recognition of a vehicle by the lanes on the road network 12a with reference to the road network 12a and a location of the vehicle. Further, by using the road network 12a, the autonomous driving application 46 searches for a detailed traveling route including a lane change from the location of the vehicle and the destination, or one point on the guidance route calculated by the map information for navigation 11.

In the navigation system 1 shown in FIG. 1, such map information for navigation 11 and map information for autonomous driving 12 are stored in the storage unit 10. In addition, the updating unit for navigation 20 updates the map information for navigation 11 at a certain update interval such as, for example, every half year or the like. When updated information by a maker of the map information for navigation 11 is obtained in a server on a network to which this navigation system 1 is connected, update of the map information for navigation 11 is performed according to an instruction from the server. On the other hand, the updating unit for autonomous driving 30 is updated according to an instruction from the server based on, for example, information of road construction or the like collected in the above-mentioned server in a short span such as one month. Thus, the map information for autonomous driving 12 is updated in a shorter span compared to the map information for navigation 11 which is updated in a long span as described above, since high consistency with an actual road environment is demanded by a nature of being used for autonomous driving.

The map information-providing unit 40 shown in FIG. 1 performs driving guidance using the map information for autonomous driving 12 in a case where the map information for autonomous driving 12 had been updated based on newer information than the map information for navigation 11 at a time of performing driving guidance. Further, the map information-providing unit 40 performs driving guidance by providing at least a portion of items to be provided by the map information for navigation 11 using the map information for autonomous driving 12 in the driving guidance. Specifically, the map information-providing unit 40 performs the driving guidance along with creating three kinds of data corresponding to the guidance point data. 11d-1, the lane data 11d-2, and the destination signboard data 11d-3 included in the map information for navigation 11. The map information-providing unit 40 includes an update judging unit 41, a map display data-creating unit 42, an object-creating unit 43, a guidance information-creating unit 44, and the guidance unit 45.

The update judging unit 41 judges whether the map information for autonomous driving 12 was updated based on the newer information than the map information for navigation 11 at a time of performing the driving guidance or not. The map display data-creating unit 42 creates display data for map for autonomous driving to visualize the lane network 12a as control information in the map information for autonomous driving 12.

The object-creating unit 43 creates object information corresponding to at least a portion of non-included objects which are not included in the display data for map for autonomous driving out of image objects in the map information for navigation 11. The creation is performed using the lane network 12a in the map information for autonomous driving 12. In the present example, the object-creating unit 43 creates two kinds of information corresponding to the lane data 11d-2 and the destination signboard data 11d-3 in the map information for navigation 11 as one example of this object information.

The guidance information-creating unit 44 creates at least a portion of guidance information for route guidance to a destination using the lane network 12a in the map information for autonomous driving 12. In the present example, the guidance information-creating unit 44 creates information corresponding to the guidance point data 11d-1 in the map information for navigation 11 as one example of the guidance information.

The guidance unit 45 performs driving guidance using the map information for autonomous driving 12. At the time of the driving guidance, the route guidance is performed by providing information appropriately according to information corresponding to the guidance point data 11d-1 created by the guidance information-creating unit 44. The guidance unit 45 includes a display unit 451, a route-searching unit 452, and a route-guiding unit 453.

The display unit 451 displays, according to a situation, a map image for navigation shown by the map information for navigation 11, and a map image for autonomous driving obtained by visualizing the map information for autonomous driving 12. Further, at the time of displaying the map image for autonomous driving, the image object shown by the above-mentioned object information and to-be-provided information according to the information corresponding the guidance point data 11d-1 are added. The route-searching unit 452 performs a route search using any of the map information for navigation 11 and the map information for autonomous driving 12 according to a judgement result by the update judging unit 41. The route-guiding unit 453 performs the route guidance according to the judgement result by the update judging unit 41 using the map image shown by the display unit 451.

Next, as an example of a map information-providing method of the present invention, a process performed by the above-mentioned navigation system 1 is described with reference to a flowchart below, although the description partly overlaps the description up to here.

Figure 3:
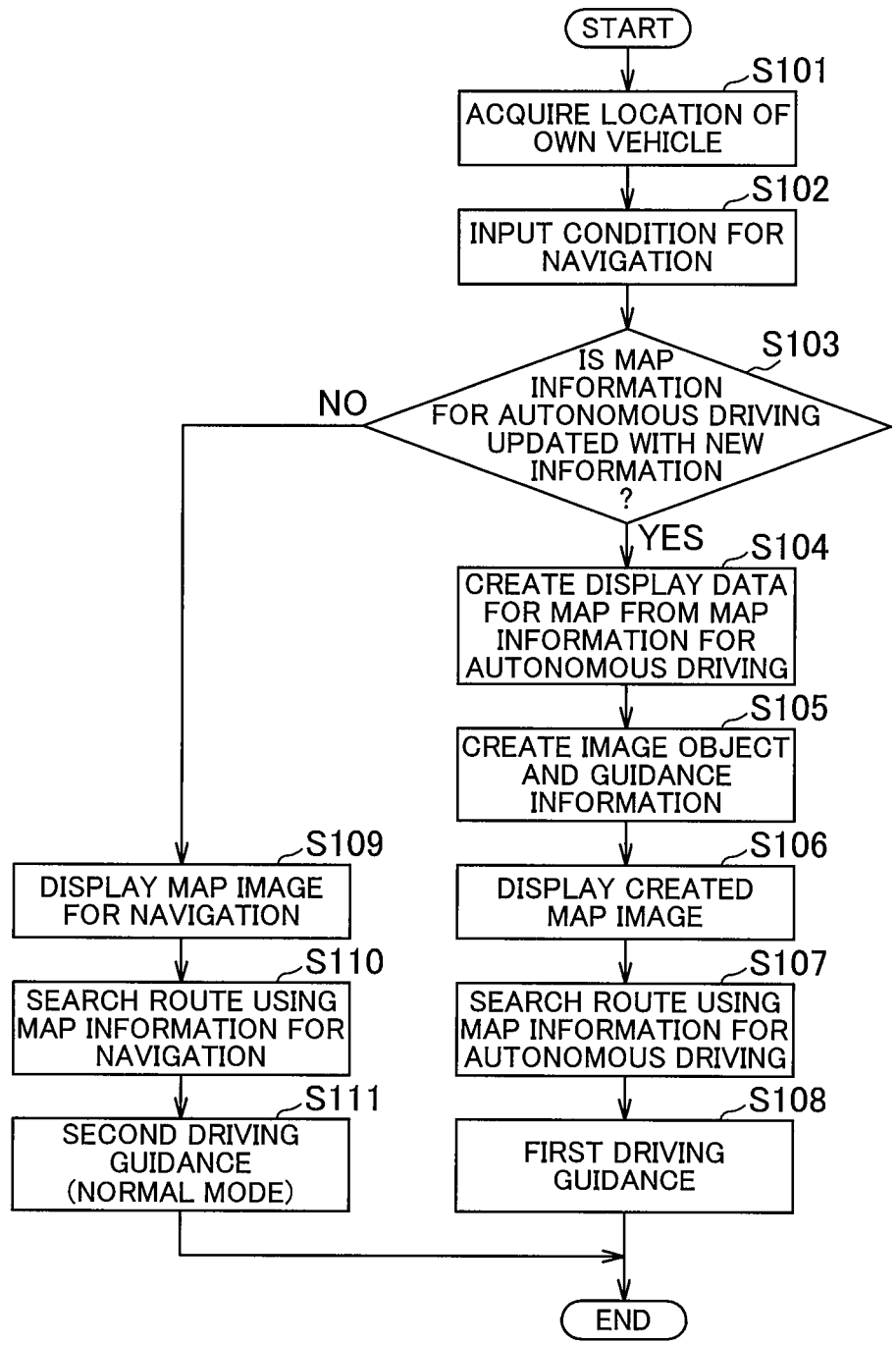
FIG. 3 is a flowchart showing a flow of a process performed in the navigation system shown in FIG. 1.

FIG. 3 is a flowchart showing a flow of a process performed by the navigation system shown in FIG. 1.

A process this flowchart shows starts when electrical power of the navigation system 1 shown in FIG. 1 is turned on. When the process is started, first, a location of a vehicle is obtained for example by GPS (Global Positioning System) installed on the vehicle (step S101). Then, conditions of navigation are inputted by a driver via a predetermined input unit in the navigation system 1 (step S102). Here, a destination of a drive or the like is inputted.

Next, in an updating process which is performed at any time separately from the process shown in the flowchart of FIG. 3, whether the map information for autonomous driving 12 has been updated based on the newer information than the map information for navigation 11 or not is judged by the update judging unit 41 (step S103). In a case where the map information for autonomous driving 12 is updated based on new information (Judged Yes in step S103), the object-creating unit 43 creates the display data for map for autonomous driving to visualize the lane network 12a in the map information for autonomous driving 12 (step S104). Then, the object-creating unit 43 creates three kinds of information corresponding to the guidance point data the lane data 11d-2, and the destination signboard data 11d-3 in the map information for navigation 11 from the lane network 12a in the map information for autonomous driving 12 (step S105). In addition, the display unit 451 displays the map image for autonomous driving, a guidance image provided according to information corresponding to the guidance point data 11d-1, a lane image or a signboard image shown by information corresponding to the lane data 11d-2 or the destination signboard data 11d-3 (step S106).

Figure 4:
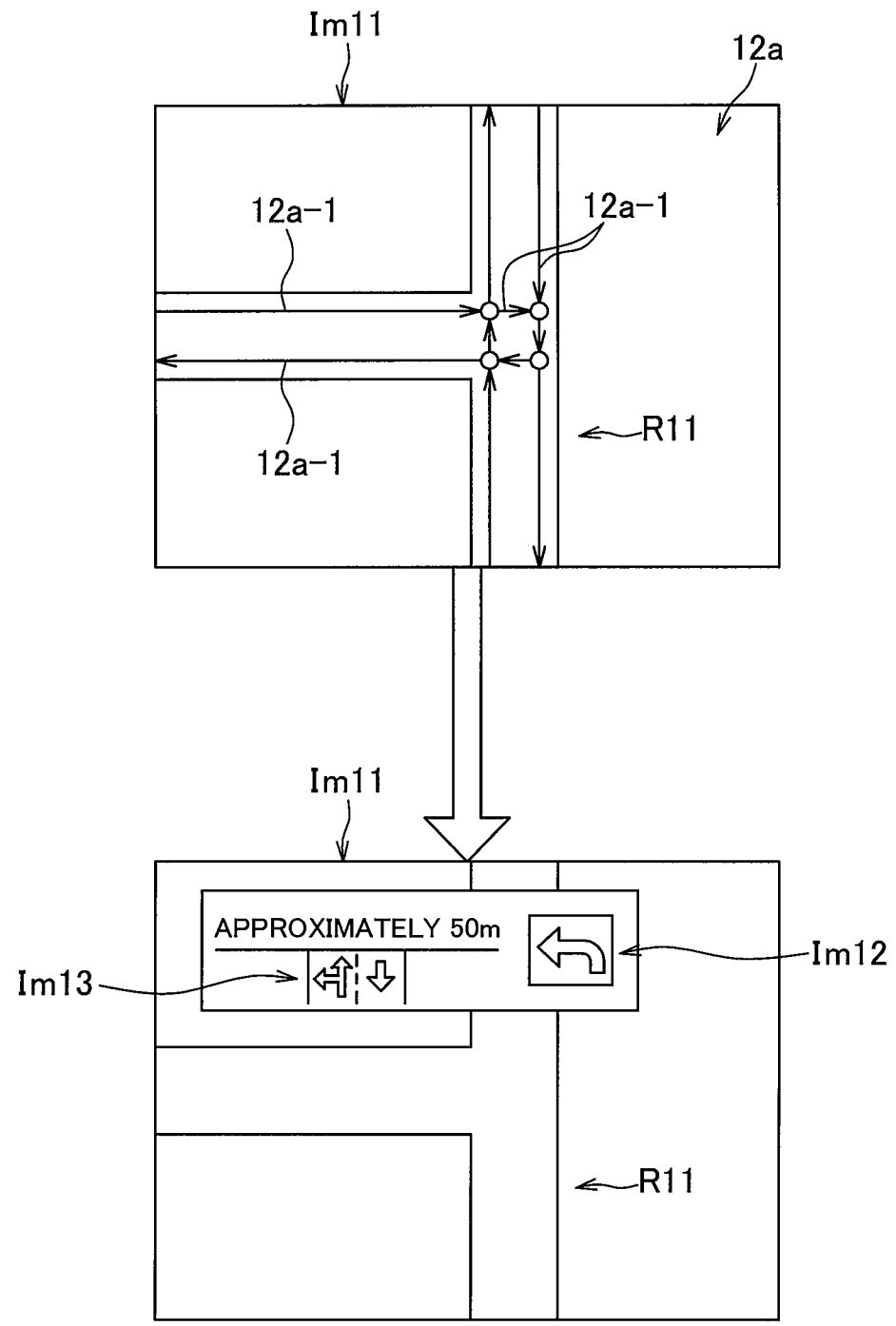
FIG. 4 is a schematic diagram showing a state where a guidance image by information corresponding to guidance point data made from map information for autonomous driving or a lane image shown by information corresponding to lane data are added to a map image for autonomous driving made from the map Information for autonomous driving.

FIG. 4 is a schematic diagram showing a state where the guidance image provided according to information corresponding to the guidance point data created from the map information for autonomous driving and/or the lane image shown by information corresponding to the lane data are added to the map image for autonomous driving shown by the display data for map for autonomous driving.

In FIG. 4, a map image for autonomous driving Im11 is illustrated in an upper part, and the map image for autonomous driving Im11 to which a guidance image Im12 and a lane image Im13 are added is illustrated in a lower part.

First, the map image for autonomous driving Im11 will be described. As described above, in the map information for autonomous driving 12, a road configuration is illustrated in detail by the lanes by the lane network 12a constituted of the lane links 12a-1. The map display data-creating unit 42 in FIG. 1 creates the display data for map for autonomous driving to visualize a road to allow a driver to see the road easily by bundling the lane links 12a-1 in the lane network 12a by the roads. The map image for autonomous driving Im11 is an image shown by the display data for map for autonomous driving. In the example here, a junction of three roods R11 having two lanes is visualized in the map image for autonomous driving Im11.

Further, the lower part of FIG. 4 illustrates the guidance image Im12 provided according to the information corresponding to the guidance point data 11d-1 of the map information for navigation 11 and the lane image Im13 shown by the information corresponding to the lane data 11d-2. The guidance image Im12 is displayed when a vehicle is passing by a location designated by the information corresponding to the guidance point data 11d-1, and is an image which gives guidance to turn right, turn left, or go straight with an arrow at a junction.

The information corresponding to the guidance point data 11d-1 and including the guidance image Im12 is created as follows. First, a junction such as an intersection or the like is calculated from a connecting status of the lane links 12*a*-1 constituting the lane network 12*a*. Further, based on an orientation of each lane link 12*a*-1 at the junction calculated, a traveling direction such as turning right, turning left, or the like at the junction can be calculated regarding each lane. Then, by making an arrow image showing the traveling direction at the junction correspond to a point which is separated from the junction by a predetermined distance (50 m in the example in FIG. 4) on each lane, information which is equivalent to the guidance point data 11*d*-1 included in the map information for navigation 11 is created. However, since this information is created based on the map information for autonomous driving 12 which is updated based on the newer information than the map information for navigation 11, this information is closer to the actual road environment than the guidance point data 11*d*-1 included in the map information for navigation 11.

In creating information corresponding to the lane data 11*d*-2, first, the traveling direction of each lane is calculated from a connecting status of the lane links 12*a*-1 constituting the lane network 12*a*. Then, information which is equivalent to the lane data 11*d*-2 included in the map information for navigation 11 is created so that arrow images showing the calculated traveling direction by lanes are arranged by the roads. However, similarly to the information corresponding to the above-mentioned guidance point data 11*d*-1, this information also is closer to the actual road environment than the lane data 11*d*-2 included in the map information for navigation 11.

Information corresponding to these guidance point data 11*d*-1 and lane data 11*d*-2 is created with respect to a region corresponding to the guidance route for this time in the map information for autonomous driving 12. Then, when driving guidance is performed, the guidance image IM12 and/or the lane image Im13 according to a road and/or a lane on which a vehicle is traveling and a location of the vehicle are added to the map image for autonomous driving Im11 of an area corresponding to a location of a traveling vehicle and displayed. Meanwhile, a creation of the information corresponding to the guidance point data 11*d*-1 and the lane data 11*d*-2 is not limited to the region corresponding to the guidance route, and may be performed across the entire region of the map information for autonomous driving 12.

Figure 5:
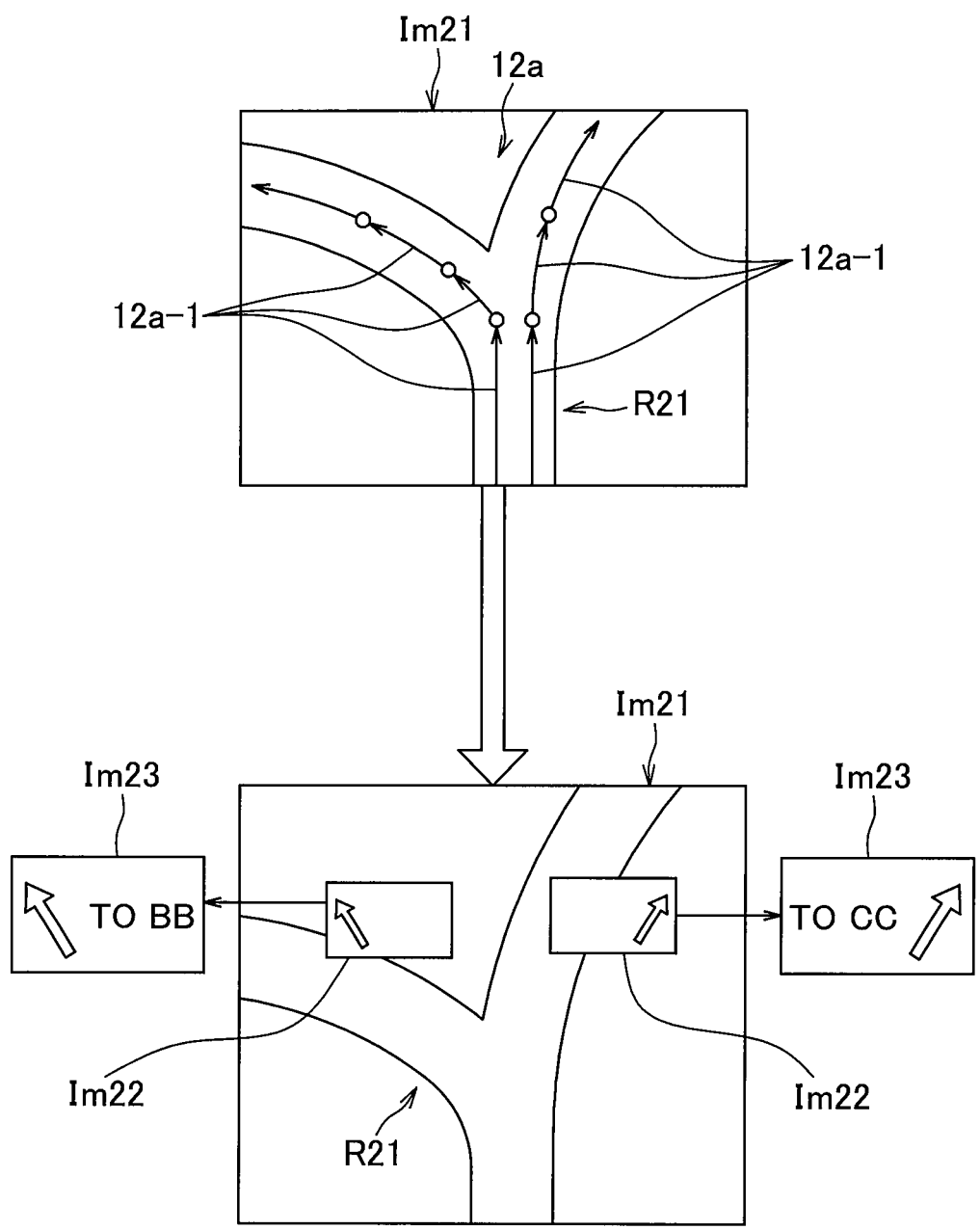
FIG. 5 is a schematic diagram showing a state where a map image for autonomous driving is made from map information for autonomous driving, and a signboard image shown by information corresponding to destination signboard data created from the map information for autonomous driving is added to the map image for autonomous driving.

FIG. 5 is a schematic diagram showing a state where a signboard image shown by information corresponding to destination signboard data created from map information for autonomous driving is added to the map image for autonomous driving shown by the display data for map for autonomous driving.

In FIG. 5, a map image for autonomous driving Im21 is shown with the driving guidance on a road which divides in two directions as an example. The map image for autonomous driving Im21 is illustrated in an upper part of FIG. 5, and the map image for autonomous driving Im21 to which a signboard image Im22 is added is illustrated in a lower part thereof.

The map image for autonomous driving Im21 illustrated in this FIG. 5 is also visualized and created by bundling the lane links 12*a*-1 on the lane network 12*a* by the roads. In the example here, a road R21 dividing in two directions which are "to BB" and "to CC" is visualized.

When creating information corresponding to the destination signboard data 11*d*-3 first, a traveling direction of each road is calculated from the connecting status of the lane links 12*a*-1 constituting the lane network 12*a*. Then, information corresponding to the destination signboard data 11*d*-3 of the map information for navigation 11 is created to show the signboard image Im22 with an arrow showing the calculated traveling direction of each road. Here, on a signboard image Im23 shown by the destination signboard data 11*d*-3 of the map information for navigation 11, a name of a destination such as "to BB" or "to CC" or the like is mentioned in addition to the arrow image. On the other hand, only the arrow image is illustrated in the signboard image Im22 shown by the information created as mentioned above, since information regarding such a name is not included in the map information for autonomous driving 12 from which the signboard image Im22 is created. However, since the information showing the signboard image Im22 is created based on the map information for autonomous driving 12 which is updated based on the newer information than the map information for navigation 11, the information showing the signboard image Im22 is closer to the actual road environment than the destination board data 11*d*-3 included in the map information for navigation 11.

Here, an example of FIG. 5 is an example simulating a branched expressway. At this time, in addition to the above-mentioned signboard image Im22, a lane image of a branched expressway showing a branched lane of the expressway may be displayed. For the lane image of this branched expressway also, the information corresponding to the lane data 11*d*-2 explained with reference to FIG. 4 is created regarding the branching of the expressway, and the lane image of the branched expressway is displayed based on the created information.

Following the display of the map image for autonomous driving Im11, Im21 in step S106 of the flowchart of FIG. 3, the route-searching unit 452 performs a search for a route to a destination using the map information for autonomous driving 12(step S107). Then, the guidance unit 45 performs a first driving guidance which is a driving guidance based on the map images for autonomous driving Im11-Im21 displayed in step S106 and a search result in step S107 (step S108).

Meanwhile, in a case where the map information for autonomous driving 12 is not updated based on the newer information than the map information for navigation 11 (Judged No in step S103), the map image for navigation shown by the map information for navigation 11 is displayed (step S109). Then, a normal route search is performed using the map information for navigation 11 (step S110). Then, following this normal route search, a second driving guidance which is a normal driving guidance is performed using the map information for navigation 11 (step S111).

The navigation system 1 in the present example is configured by a computer. A map information-providing program is stored in the computer to cause the computer to execute the map information-providing method shown by the flowcharts of FIGS. 3 and 6. The computer operates according to the map information-providing program, thereby building the navigation system 1 shown in FIG. 1.

In the navigation system 1 in the present example explained above, the map information for navigation 11 (first map information) and the map information for autonomous driving 12 (second map information) updating periods thereof are different from each other are stored in the storage unit 10. In addition, the map information-providing unit 40 provides map information by using the map information for autonomous driving 12 in a case where the map information for autonomous driving 12 had been updated based on the newer information than the map information for navigation 11 at a time of providing the map information to a driver by an image display or the like. That is, even when discrepancy is generated between an actual road environment and the map information for navigation 11, driving guidance based on the map information for autonomous driving 12 which has high consistency with the actual road environment is performed. Three kinds of information which are not originally included in the map information for autonomous driving 11 corresponding to the guidance point data 11*d*-1, the lane data 11*d*-2, and the destination signboard data 11*d*-3 are complemented by a creation performed using new map information for autonomous driving 11 and provided. Thus, according to the navigation system 1 in the present example, the map information can be provided while suppressing incongruity a driver feels by using the map information for autonomous driving 12 which has high consistency with the actual road environment and by providing various information using the map information for autonomous driving 12.

Here, in the navigation system 1 in the present example, the information corresponding to the above-mentioned guidance point data 11*d*-1 is created from the lane link 12*a*-1 of the lane network 12*a* of the map information for autonomous driving 12. This enables the driving guidance based on the information corresponding to the guidance point data 11*d*-1, and thus driving guidance can be performed while further suppressing the incongruity the driver feels.

Further, in the navigation system 1 of the present example, the object information showing the lane image Im13 and/or the signboard image Im22 as the non-included object which is not included in the map images for autonomous driving Im11 and Im21 is created from the above-mentioned lane link 12*a*-1. This enables the driving guidance based on the map images for autonomous driving Im11 and Im21 including the lane image Im13 and/or the signboard image Im22 shown by such object information, and thus driving guidance can be performed while further suppressing the incongruity the driver feels.

The present invention is not limited to the example explained above, but the invention includes other configurations which can achieve the object of the present invention, and the following modifications are also included in the present invention.

For example, in the above-mentioned example, as one example of the map information-providing system of the present invention, the navigation system 1 is exemplary shown in FIG. 1. However, the map information-providing system of the present invention is not limited to this. The map information-providing system of the present invention may be a system which provides map information on the network such as, for example, Google Maps (registered trademark). The map information-providing system of the present invention may be a system that, for example, appropriately obtains and stores other fresh map information together with a main map information in the system, combines the other map information with the main map information and provides combined map information.

Further, in the above-mentioned example, as the one example of the map information-providing system of the present invention, the navigation system 1 in which all the elements shown in FIG. 1 are mounted in a vehicle is exemplified. However, the map information-providing system of the present invention is not limited to this. The Map information-providing system of the present invention may be a system in which a portion of the elements thereof is mounted in a vehicle, and the rest of the elements is configured on the network and wirelessly connected to the elements on the vehicle side. Or, the map information-providing system may be a system in which, for example, only the display unit is mounted on vehicle, and all of the rest of the elements is configured on the network and wirelessly connected to the display unit on the vehicle side. In this case, the map information-providing program is executed by a computer on the network except a portion related to the display.

Further, in the example mentioned above, as one example of the map information-providing unit of the present invention, the map information-providing unit 40 which creates the three kinds of information corresponding to the guidance point data 11*d*-1, the lane data 11*d*-2, and the destination signboard data 11*d*-3 of the map information for navigation 11 is exemplified. However, the map information-providing unit of the present invention is not limited to this. In the map information-providing unit of the present invention, as long as map information is provided by providing at least a portion of items provided by the map information for navigation using the map information for autonomous driving, the specific items to be provided does not matter.

REFERENCE SIGNS LIST 1 navigation system (map information-providing system)
10 storage unit
11 map information for navigation (first map information)
11*a* road network
11*a*-1 road link
11*b* background data
11*c* name data
11*d* route guidance data
11*d*-1 guidance point data
11*d*-2 lane data
11*d*-3 destination board data
12 map information for autonomous driving (second map information)
12*a* lane network
12*a*-1 lane link
20 updating unit for navigation
30 updating unit for autonomous driving
40 map information-providing unit
41 update judging unit
42 map display data-creating unit
43 object-creating unit
44 guidance information-creating unit
45 guidance unit
45*a* navigation application
46 autonomous driving application
451 display unit
452 route-searching unit
453 route-guiding unit
Im11, Im21 map image for autonomous driving
Im12 guidance image
Im13 lane image
Im22, Im23 signboard image
R11 junction of three mads

The invention claimed is:

1. A map information-providing system comprising:
a memory storage storing first map information and second map information, wherein an updating period of the second map information is different from an updating period of the first map information with respect to at least a portion of a period of time; and
a processor configured to provide at least a portion of items to be provided by the first map information using the second map information in a case where the second map information had been updated based on newer information than the first map information at a time of providing the map information, thereby providing map information which is the second map information that is visualized through object creation and on which the at least the portion of items is added, the map information being guidance information for route guidance, wherein the first map information is map information for navigation having image information for providing driving guidance to a driver of a vehicle, wherein the second map information is map information for autonomous driving having control information for autonomous driving of the vehicle, and wherein performing the object creation comprises creating, using the control information, object information corresponding to at least a portion of image objects in the map information for navigation.

2. The map information-providing system according to claim 1, wherein route guidance to a destination is comprised in the items;

wherein the processor is further configured to create at least a portion of guidance information for the route guidance using the control information in the map information for autonomous driving; and wherein the processor is further configured to perform the route guidance based on result of the created the at least a portion of guidance information.

3. The map information-providing system according to claim 2, wherein the processor is further configured to create display data for a map for autonomous driving to visualize the control information in the map information for autonomous driving; and wherein the performing the object creation by the processor further comprises creating, using the control information, object information corresponding to at least a portion of non-included objects that are not included in the display data for map for autonomous driving out of image objects in the map information for navigation.

4. The map information-providing system according to claim 1, wherein the processor is further configured to create display data for a map for autonomous driving to visualize the control information in the map information for autonomous driving; and wherein the performing the object creation by the processor further comprises creating, using the control information, object information corresponding to at least a portion of non-included objects that are not included in the display data for map for autonomous driving out of image objects in the map information for navigation.

5. A map information-providing method comprising:

an update judging step of judging whether second map information has been updated based on newer information than first map information at a time of providing map information or not, wherein an updating period of the first map information and an updating period of the second map information are different from each other for at least a portion of a period of time; and a map information-providing step of providing at least a portion of items to be provided by the first map information using the second map information in a case where the judgement is made that the second map information has been updated based on newer information than the first map information, thereby providing map information which is the second map information that is visualized through object creation and on which the at least the portion of items is added, the map information being guidance information for route guidance wherein the first map information is map information for navigation having image information for providing driving guidance to a driver of a vehicle, wherein the second map information is map information for autonomous driving having control information for autonomous driving of the vehicle, and wherein performing the object creation comprises creating, using the control information, object information corresponding to at least a portion of image objects in the map information for navigation.

6. A map information providing program executed by a computer to perform the map information-providing method according to claim 5.

* * * * *